March 17, 1953     A. W. FRANCIS     2,632,030
SOLVENT EXTRACTION
Filed May 19, 1950
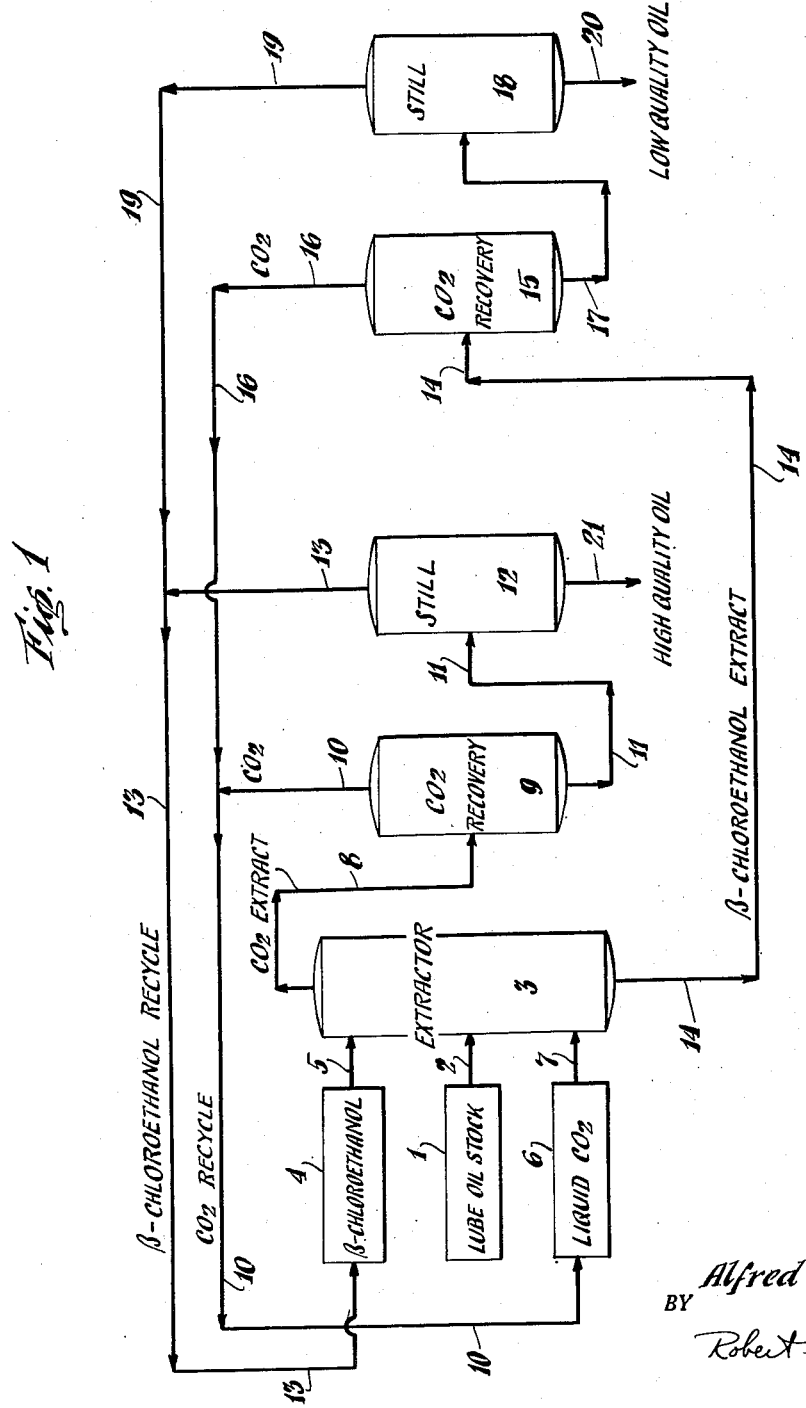
INVENTOR.
Alfred W. Francis
BY
Robert D. Flynn
AGENT March 17, 1953　　　A. W. FRANCIS　　　2,632,030
SOLVENT EXTRACTION
Filed May 19, 1950　　　　　　　　　　2 SHEETS—SHEET 2
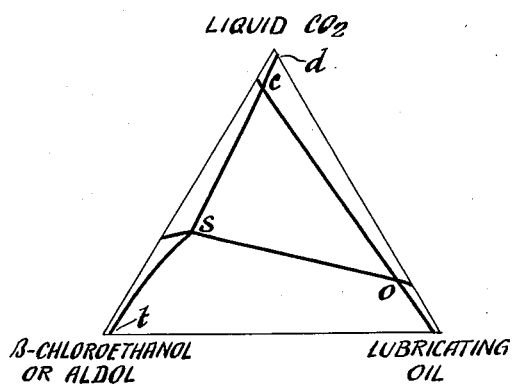
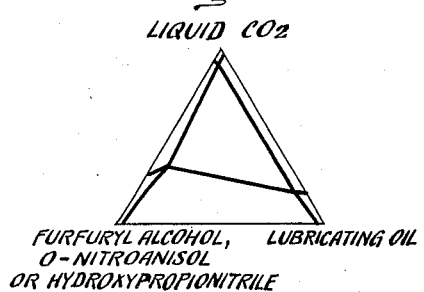
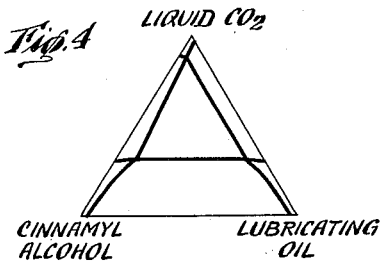
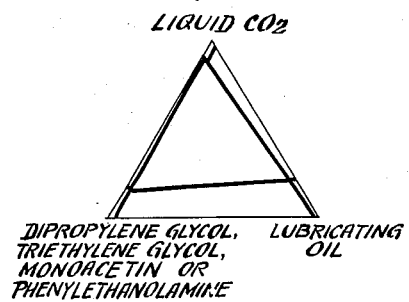
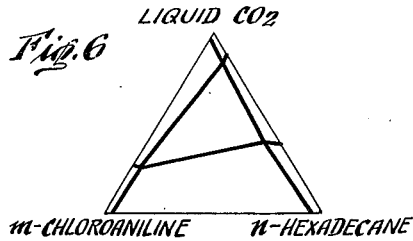
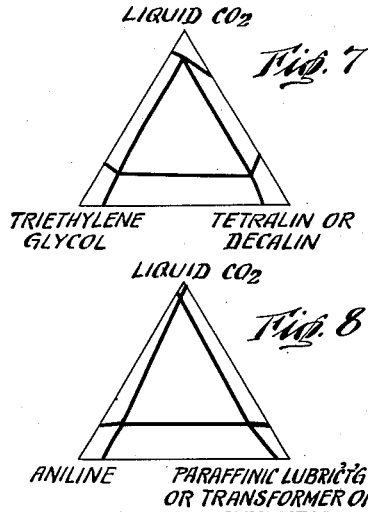
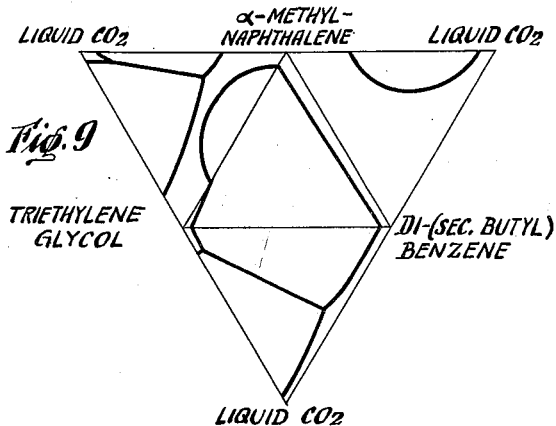
INVENTOR.
Alfred W. Francis
BY
Robert D. Flynn
AGENT Patented Mar. 17, 1953

2,632,030

UNITED STATES PATENT OFFICE 2,632,030

SOLVENT EXTRACTION

Alfred W. Francis, Woodbury, N. J., assignor to Socony-Vacuum Oil Company, Incorporated, a corporation of New York Application May 19, 1950, Serial No. 162,998

10 Claims. (Cl. 260—674)

This invention has to do with extraction with certain selective solvents of various mixtures, and particularly hydrocarbon mixtures such as lubricating oil stocks, to separate the mixtures into fractions having different properties.

I. FIELD OF INVENTION

Numerous processes have been developed for the separation of hydrocarbons and hydrocarbon derivatives of different molecular configuration by taking advantage of their selective solubility in selected reagents or solvents from which they later can be separated. Exemplary of hydrocarbon separation procedures is the Edeleanu process, wherein paraffinic materials are separated from aromatics by virtue of the greater solubility of aromatics in liquid sulfur dioxide. Lubricating oil solvent refining processes, solvent deasphalting, solvent dewaxing and the like are further examples of the separation of hydrocarbons of different molecular configuration.

Many liquids have been proposed and some of them have been used as selective solvents for effecting separation of different classes of hydrocarbons. They vary greatly in selectivity and in applicability for various boiling ranges of hydrocarbons. For the same boiling range the solubility increases in the order, paraffins, naphthenes, olefins, alkyl benzenes and polycyclic aromatics for practically all available solvents. For many extractions this is a convenient order, since small quantities of polycyclics which are detrimental to the viscosity index of a lubricant, can be removed by suitable solvents. In other cases, a reverse order of selectivity would be more convenient. Solvents having the latter selectivity are probably so characterized only when used in the vicinity of their critical temperatures. For example, propane—critical temperature, 95.6° C.—has been used at 80-100° C. for solvent refining of vegetable oils, but for mineral oils it has a very limited applicability, because only a few polycyclics separate at all and the selectivity is slight. Ethane—critical temperature, 32.3° C.—is no better in this respect.

Liquid carbon dioxide, however, has unusual miscibility relations with hydrocarbons and other substances, for it dissolves aliphatic and monocyclic aromatic hydrocarbons in preference to polycyclics of the same boiling range. The selectivity is many times greater than that manifested by propane and ethane. The miscibility relationship, then, is the reverse of that with almost all other solvents, in which the more highly cyclicized hydrocarbons are more soluble. While liquid carbon dioxide is advantageous in view of this unusual miscibility characteristic, and is also favored by low cost, non-corrosiveness, non-toxicity, and ease of recovery from extract and raffinate phases, its use is limited by its complete miscibility with most gasoline hydrocarbons and on the other hand by its slight solubility for lubricating oils. For example, it has been shown that the maximum solubility for a typical lubricating oil in liquid carbon dioxide is only 0.9 per cent at 10° C.; and at 25° C., the solubility is only 0.72 per cent. To one skilled in the art, it is obvious that these solubilities are too low for practical purposes.

Carbon dioxide has a critical temperature of 31.1° C. (88° F.).

This invention is predicated upon the discovery of an advantageous and practical solvent extraction procedure in which liquid carbon dioxide is used in combination with certain solvents with which it cooperates.

II. PRIOR ART

One of the first to extract oils with liquid carbon dioxide was Auerbach. As shown by Auerbach in U. S. Letters Patent 1,805,751 and related foreign patents (Canadian 285,782 and British 277,946 and 285,064), certain very light lubricating oil fractions are soluble in liquid carbon dioxide to the extent of only about three per cent. Schilling and Stadler (2,029,120) also described a selective separation with liquid carbon dioxide, showing the removal of unsaturated hydrocarbons from gas mixtures.

Several investigators have also described a selective separation of hydrocarbons in which liquid carbon dioxide is used in combination with liquid $SO_2$ (2,034,495; 2,346,639; German 546,123). Refining of petroleum fractions to effect removal of sulfur compounds, using $SO_3$ in combination with liquid carbon dioxide is disclosed by Gary (1,893,138).

Low molecular weight paraffins, such as propane, have also been used with liquid carbon dioxide in extracting hydrocarbon mixtures. This is shown by Lantz (2,188,051).

Liquid carbon dioxide has also been described as a selective extractant by Webb (2,246,227). Typical of the diluents shown by the latter for use with liquid carbon dioxide are: hydrocarbons such as propane; solvents such as acetone, pyridine, liquid $SO_2$, cresylic acid and other solvents of the type of preferential solvents for non-paraffinic hydrocarbons. A similar disclosure is presented in 2,281,865 (Van Dijck); used with liquid carbon dioxide are hydrocarbons and solvents known as selective or naphthenic (or aromatic) solvents such as furfural, nitrobenzene, chlorex, cresylic acid, phenol, aniline and quinoline. Some of the solvents used by Van Dijck are necessarily employed in relatively small quantities; actually, only those quantities which are miscible with an oil. In the case of furfural, aniline and phenol, the quantities used are minute, of the order of one or two per cent. Pilat and Godlewicz (2,315,131) have modified the processes described by Lantz, Webb, and Van Dijck, by using gaseous carbon dioxide with another solvent such as a hydrocarbon or a selective or naphthenic solvent.

III. OUTLINE OF INVENTION

It has now been discovered that a plurality of fractions of different properties are obtained by contacting a mixture of compounds, particularly lubricating oil stocks, with liquid carbon dioxide and a solvent which is incompletely miscible with liquid carbon dioxide and with the mixture of compounds, forms three phases with the liquid carbon dioxide and the mixture, and does not form a solid salt with carbon dioxide at temperatures of 20° C. and higher.

IV. OBJECTS

It is an object of this invention, therefore, to provide an effective means for separating a multiplicity of fractions or compounds of different properties from mixtures containing the same.

It is also an object of this invention to provide for the selective separation of several hydrocarbon fractions of different properties from hydrocarbon mixtures. An important object is the selective separation of several hydrocarbon fractions, differing in properties, from high molecular weight hydrocarbon mixtures, and particularly from lubricating oil stocks. A further object is to selectively separate polycyclic aromatic hydrocarbons from mixtures containing the same. Still another object is to selectively separate alkyl benzenes from mixtures containing the same.

Other objects and advantages of the invention will be apparent from the following description.

V. INVENTION IN DETAIL

As indicated above, liquid carbon dioxide and a second solvent, described more fully hereinbelow, are used together in the selective separation process of this invention.

Liquid carbon dioxide miscibilities are related to structure. Among hydrocarbons, the lower non-aromatics up to about $C_{12}$ and monocyclics up to $C_{18}$ are miscible therewith; but polycyclics with rings either fused or not, and saturated or not, have limited miscibility. More specifically, liquid carbon dioxide has been found to be completely miscible at 25° C. with paraffins up to $C_{12}$, olefins up to $C_{16}$, alkylbenzenes up to $C_{18}$ and with naphthenes, cyclohexane and methylcyclohexane, but only moderately soluble with n-tetradecane, n-hexadecane, n-octadecane, 1-octadecene, and bicyclics such as naphthalene, tetralin, decalin and alpha- and beta-methylnaphthalene, di-methylnaphthalenes, biphenyl, bibenzyl, diphenylmethane and phenylcyclohexane. Its solubility for lubricating oil is slight, as indicated above. These solubility relationships can be modified to only a small degree by temperature changes.

Similar solubility relationships obtain with hydrocarbon derivatives. For example, substituents such as methyl, halogen, ether oxygen and carbonyl groups, on a hydrocarbon, have little effect upon miscibility. Hydroxyl, nitro, amino and sulfonic acid groups are much more pronounced in diminishing solubility.

As indicated above in III, this invention employs solvents with liquid carbon dioxide which are incompletely miscible with liquid carbon dioxide and with the mixture to be extracted, and form three phases with the liquid carbon dioxide and mixture. In addition, solvents in this group do not form solid salts with carbon dioxide at temperatures of 20° C. and greater. Preferably, too, if the solvents are not normally liquid, they should become so in contact with liquid carbon dioxide. This generally occurs if their melting points are less than about 60° C. Included among this class of solvents are the following: aldol, aniline, $\beta$-chloroethanol (ethylene chlorohydrin), $\alpha$-chloropropionic acid, cinnamyl alcohol, 2,4-dinitrochlorobenzene, dipropylene glycol, formamide, formanilide, furfuryl alcohol, glycerol, $\beta$-hydroxyethylacetate, $\beta$-hydroxypropionitrile, lactic acid, maleic anhydride, monoacetin, o-nitroanisole, phenylethanolamine, piperonal, triethylene glycol and succinonitrile. Of these solvents, ethylene chlorohydrin and furfuryl alcohol have been found to be particularly effective in cooperating with liquid carbon dioxide. Aniline is satisfactory with paraffinic stocks, but less effective in this type of operation with other hydrocarbon stocks.

The hydrocarbon miscibilities of the foregoing solvents together with carbon dioxide solubilities for the solvents, are shown in Table I, below.

*Table I*

| Solvent | Hydrocarbon Miscibility [1] | Solubility, for $CO_2$ | Wt. Percent [2] in $CO_2$ |
|---|---|---|---|
| Aldol | a | 31 | 11 |
| Aniline | b | 20 | 3 |
| Cinnamyl alcohol | b | 20 | 5 |
| Dipropylene glycol | b | 15 | 2 |
| Maleic anhydride (M. Pt. 57° C.) | b | 55 | 7.5 |
| o-Nitroanisole | b | 35 | 2 |
| $\beta$-Chloroethanol | c | 40 | 10 |
| $\alpha$-Chloropropionic acid | c | 52 | 26 |
| 2,4-Dinitrochlorobenzene (M. Pt. 53° C.) | c | 15 | 1 |
| Formanilide (M. Pt. 47.5° C.) | c | 10 | 0.5 |
| Furfuryl alcohol | c | 30 | 4 |
| $\beta$-Hydroxyethyl acetate | c | 50 | 17 |
| Phenylethanolamine | c | 15 | 1 |
| Piperonal (M. Pt. 37° C.) | c | 45 | 10 |
| Triethylene glycol | c | 12 | 6 |
| Diethylene glycol | d | 10 | 1 |
| Ethylene glycol | d | 7 | 0.2 |
| Formamide | d | 10 | 0.5 |
| Glycerol | d | 7 | 0.05 |
| $\beta$-Hydropropionitrile | d | 30 | 1 |
| Lactic acid | d | 8 | 0.5 |
| Monoacetin | d | 10 | 1 |
| Propylene glycol | d | 10 | 0.5 |
| Succinonitrile (M. Pt. 54.5° C.) | d | 20 | 1 |

[1] Hydrocarbon miscibilities at 25° C. as liquid. A solid is considered miscible with a hydrocarbon or carbon dioxide if it is highly soluble in it (e. g., over 40%) without the formation of liquid layers in equilibrium. If a substance is miscible with one group of hydrocarbons as indicated by a footnote letter, it is also miscible with all of the hydrocarbons indicated by letters following this one in the series. Thus "a" actually means "a, b, c"; "b" means "b, c".
[2] Solubilities of 2% or less are approximations in view of the difficulty in determining the same.
a—Miscible with methylcyclohexane and lower naphthenes, but not miscible with paraffin hydrocarbons.
b—Miscible with di-(sec. butyl) benzene and lower aromatics.
c—Miscible with benzene.
d—Not miscible with any hydrocarbon.

The foregoing solvents and liquid carbon dioxide are effective in resolving various mixtures into a multiplicity of fractions, or compounds, of different properties. They are particularly advantageous in the resolution of lubricating oil stocks, representative of which are Pennsylvania, Mid- Continent and Coastal types, or paraffinic, naphthenic and aromatic types. Other hydrocarbon mixtures successfully treated include gas oils, fuel oils, shale oils, transformer oils, cable oils, coal tar fractions, etc. Still other mixtures which can be treated with appropriate solvents, by the procedures described herein, include: mixtures of alcohols, such as those obtained by hydrogenation of oxides of carbon; mixtures of vegetable oils; mixtures of aromatic amines; etc.

In order that this invention may be more readily understood, a typical separation is described below with reference being made to the Figure 1 attached hereto.

In Figure 1, a charge such as a highly naphthenic lubricating oil stock, for example, one having a density of 0.910, a refractive index ($n_D^{20}$) of 1.5076 and a critical solution temperature (aniline) of 72° C., in tank 1 is introduced through line 2 to extractor 3. $\beta$-Chloroethanol in tank 4 is introduced through line 5 to an upper section of 3, and liquid carbon dioxide in tank 6 is introduced through line 7 to a lower section of extractor 3. It will be understood that the extractor 3 can comprise conventional countercurrent stage or tower extraction equipment. Contact of $\beta$-chloroethanol, liquid carbon dioxide and oil can also be aided by conventional packing material in extractor 3.

The temperature of the oil and solvents in extractor 3 should be not much greater than about 31.1° C., the critical temperature of carbon dioxide. Slightly higher temperatures, up to about 36° C., can be used in some cases because enough solvent (e. g. $\beta$-chloroethanol) and/or hydrocarbon can dissolve in the carbon dioxide-rich phase to make it liquid above the critical temperature of pure carbon dioxide. This temperature condition can be realized by maintaining both the oil and solvents at the required temperature prior to introduction to the extractor 3, or the latter can be maintained at the required temperature by well known cooling or heat exchange means. The pressure in extractor 3 is maintained sufficiently high so as to maintain a phase rich in carbon dioxide in the liquid state.

The ratio of solvent, $\beta$-chloroethanol, to oil in the extractor 3 is preferably maintained within the range of 1:1 to 2:1, and that of liquid carbon dioxide to oil within the range 1:1 to 5:1. This feature is explained in more detail hereinafter with reference to a phase diagram (Figure 2) for the system liquid carbon dioxide-$\beta$-chloroethanol-lubricating oil.

In the extractor 3, three layers are formed. The top layer comprises liquid carbon dioxide and high quality oil components, namely oil substantially free from polycyclic hydrocarbons. A small amount of $\beta$-chloroethanol is generally present as well in the top layer. The middle layer approximates the oil stock charge and is recycled. The bottom layer comprises $\beta$-chloroethanol, polycyclic hydrocarbons and a small amount of liquid carbon dioxide.

The top layer, carbon dioxide extract, is removed from the extractor 3 through line 8 and is introduced into a carbon dioxide removal unit 9. The latter is equipped with suitable means for effecting release of carbon dioxide from the carbon dioxide extract. For example, a heat exchange medium can be circulated through the wall of unit 9 or through coils therein, to raise the temperature of the carbon dioxide extract. Also, pressure reducing means can be provided. In unit 9, then, carbon dioxide is removed through line 10 and recycled to reservoir 6. In line 10, a condenser (not shown) is used when carbon dioxide is removed by applying heat to vessel 9; or a compressor (not shown) is positioned in line 10 when carbon dioxide is removed by pressure reduction. The carbon dioxide extract, substantially free of carbon dioxide, is taken through line 11 to still 12. The extract is fractionated in still 12, with the $\beta$-chloroethanol being taken overhead through line 13 and recycled to reservoir 4. The extract oil, now substantially free from $\beta$-chloroethanol, is removed from still 12 through line 21. As indicated above, this oil fraction is of high quality. It has a viscosity index appreciably higher than that of the oil stock in reservoir 1.

Referring back to extractor 3, the middle layer formed therein comprises an oil of substantially the same composition as the oil charge. It is recycled, in effect, by leaving it there and extracting it continuously with liquid carbon dioxide flowing upward and by $\beta$-chloroethanol flowing downward.

The bottom layer in extractor 3 is the $\beta$-chloroethanol extract comprising $\beta$-chloroethanol, polycyclic hydrocarbons and a relatively small quantity of carbon dioxide. This extract is taken through line 14 to carbon dioxide removal unit 15, which is of the same character as unit 9. Carbon dioxide is taken off overhead through line 16 and is recycled through line 10 and reservoir 6. The remainder of the $\beta$-chloroethanol extract is removed from 15 through line 17 and is introduced into still 18. The $\beta$-chloroethanol is fractionated overhead through line 19 and is recycled through line 13 to reservoir 4. The extract oil is removed from still 18 through line 20. This extract oil is of poor quality, having a lower viscosity index than the charge oil; it is suitable for use, for example, as an insecticidal oil.

It will be recognized that the foregoing illustration provided by Figure 1 is diagrammatic, and that pumps, heaters, cooler, heat exchangers, pressure vessels of various character can be employed.

As indicated above, carbon dioxide is used in liquid form, thus requiring the use of relatively low temperature and high pressures. In effect, the operating temperatures will be below or not much above the critical temperature of carbon dioxide, namely, 31.1° C. While the temperature can be lowered considerably below 31.1° C. satisfactory operation has been realized with temperatures within the range of 10° C. to 35° C. Operating pressures are relatively high, generally at or about 1,000 pounds per square inch (or 70 atmospheres). Usually, pressures are of the order of 600 to 1200 pounds per square inch. Higher pressures make it possible to increase the solubility of various materials in liquid carbon dioxide. For example, with a pressure of 1,000 pounds per square inch (p. s. i.) and a temperature of 24° C., the solubility of n-octadecane in liquid carbon dioxide was found to be about three per cent; whereas, with a pressure of 4,000 pounds per square inch and a temperature of 24° C., the solubility was eleven per cent. This phenomenon of contracting on mixing is advantageous, particularly inasmuch as the solubility of lubricating oils in carbon dioxide is undesirably low at the vapor pressure of carbon dioxide. The increase from 3% to 11%, mentioned above, is unusual since the density of the solution is increased enough to make the undissolved oil float upon the solution. The pressure at which inversion occurs varies with the density of the oil, being higher for oils of high density and vice versa. With a decrease of pressure, as by opening a pressure reducing valve, a small amount of oil is released, whereupon the layers are inverted again. This increases the volume of undissolved oil. In this way, liquid pressure can be used to control the solubility of the oil.

The invention is further illustrated by experimental data obtained with liquid carbon dioxide and β-chloroethanol and other solvents recited hereinabove. These experimental data are presented in the form of charts, or more particularly ternary diagrams, identified here as Figures 2 to 9. These diagrams can be used to determine: the suitability of a solvent for the desired separation; the selectivity of the solvents; the range of compositions of liquid carbon dioxide, solvent, and the mixture to be treated; the number of stages or extractions necessary to effect a separation of desired degree; etc.

Figure 2 represents the system liquid carbon dioxide, β-chloroethanol and lubricating oil. It is to be understood that in Figure 2 and in all of the ternary diagrams involving lubricating oils, the phase boundaries are necessarily approximate since the oil is not a pure substance. In fact, the purpose of the operation is to separate the oil into fractions of different properties which include miscibilities with the solvents. Therefore, with the countercurrent operation in extractor 3 of Figure 1, the effective diagram of Figure 2 is appreciably different at the bottom and at the top of the extractor. The difference is that at the top, c in Figure 2 is farther from the left side line indicating a higher solubility for oil in liquid carbon dioxide, and s is closer to the left side line indicating lower solubility for oil in β-chloroethanol. At the bottom of the extractor, the reverse effect exists.

The oil used in the examples is a highly naphthenic distillate stock having the following properties:

| | |
|---|---|
| A. P. I. gravity | 23.8 |
| Density | 0.910 |
| Refractive index, $N_D^{20}$ | 1.5076 |
| Critical solution temperature (with aniline) ° C. | 72 |
| Pour point, ° F. | 20 |
| Flash, open cup, ° F. | 395 |
| Fire, ° F. | 455 |
| Viscosity, centistokes @ 100° F. | 28.65 |
| Viscosity, centistokes @ 210° F. | 4.51 |
| Viscosity index | 60 |
| Viscosity gravity constant | 0.871 |
| Color, Lovibond | 18 |

Figure 2 reveals that of the three components, β-chloroethanol, liquid carbon dioxide, and oil, no two are completely miscible. However, each binary mutual solubility is increased by the presence of the third component. Thus, c is farther from the left side than d, and s is farther than t, indicating in each case an increase in concentration of the oil due to dilution by the other solvent. (d and t represent saturated solutions of oil in liquid carbon dioxide and β-chloroethanol, respectively.) The three layers have the respective compositions: c—top or carbon dioxide-rich layer; o—middle or oil-rich layer; and s—bottom or β-chloroethanol-rich layer. The selectivities of the two solvents, chlorhydrin and liquid carbon dioxide, are opposite inasmuch as the chlorhydrin selects polycyclic hydrocarbons and liquid carbon dioxide rejects such hydrocarbons. Thus, the selectivities are additive and cooperative, since the oil becomes more soluble in each solvent because of removal of less soluble material by the other solvent.

Figures 2 through 9, inclusive, are ternary diagrams with other solvents of the type contemplated herein and recited above.

Figure 2 represents also the system: liquid carbon dioxide-aldol-lubricating oil.

Figure 3: liquid carbon dioxide-furfuryl alcohol, o-nitroanisol, or hydroxypropionitrile-lubricating oil (same as in Fig. 2).

Figure 4: liquid carbon dioxide-cinnamyl alcohol-lubricating oil.

Figure 5: liquid carbon dioxide-dipropylene glycol, monoacetin, phenylethanolamine or triethylene glycol-lubricating oil.

Figure 6: liquid carbon dioxide-m-chloroaniline-n-hexadecane.

Figure 7: liquid carbon dioxide-triethylene glycol-tetralin (also decalin).

Figure 8: liquid carbon dioxide-aniline-paraffinic lubricating oil (also transformer oil).

Figure 9: the quaternary system, liquid carbon dioxide-triethylene glycol-α-methylnaphthalene-di-(sec. butyl) benzene.

The data from which Figures 2–9 were prepared, were obtained with a visual autoclave, operating at room temperature, about 25° C. The autoclave is a Jerguson gauge of 116 parts by volume capacity, with thick narrow Pyrex glass windows front and back. Incandescent lamps are mounted behind the vertical position of the autoclave. Agitation of the materials is obtained by rotation, end-over-end, within a heat-insulated case. The latter is provided with strip heaters which permit heating by radiation, and with means for cooling to low temperature. The autoclave was charged with the liquid reagents, liquid carbon dioxide being taken from a cylinder. Solubility of carbon dioxide in another liquid was estimated by charging a definite volume of that liquid and then adding carbon dioxide until after agitation a new liquid phase appeared (at the top). Then additional increments of liquid carbon dioxide were added. By extrapolation, the drop in equilibrium position of the interface could be used to estimate approximately the solubility of the other liquid in liquid carbon dioxide. If there was no separation into two liquid phases, the miscibility was considered to be complete only after about three volumes of carbon dioxide were added for one of the other liquid.

The selectivity of liquid carbon dioxide for alkylbenzenes and that of triethylene glycol for alkylnaphthalenes, respectively, are shown by selecting a liquid hydrocarbon of each class having nearly the same boiling point and, therefore, not readily separable by distillation. Mixtures of the hydrocarbons were prepared and extracted with liquid carbon dioxide alone, triethylene glycol alone, and with liquid carbon dioxide in combination with triethylene glycol.

Alpha-methylnaphthalene, boiling point 245° C., was selected as a typical alkylnaphthalene. Di-(secondary-butyl) benzene, boiling point about 239° C., was synthesized by alkylation of benzene with 2-butene, and was separated by distillation from the mono- and tri-butylbenzene products. Although the di-(secondary-butyl) benzene product has a boiling range of less than two degrees (C.), namely 238–240° C., it probably contained both meta and para (and possibly ortho) isomers. The isomers probably have almost identical properties, including miscibilities, so that separation of the isomers, which is extremely difficult, was considered unnecessary. In other words, the presence of three such isomers in the product would not materially influence the results of the extractions.

Mixtures of alpha-methylnaphthalene and di-(secondary-butyl) benzene can be analyzed readily by refractive index, which is approximately a linear function of per cent by volume. The refractive indices of the two hydrocarbons were observed to be 1.6140 and 1.4857, respectively, at 20° C.

A mixture of 33.3 volume per cent of di-(secondary-butyl) benzene and 66.7 volume per cent of alpha-methylnaphthalene were extracted with liquid carbon dioxide at 10° C. and 650 pounds per square inch in the aforesaid Jerguson guage. Thirty (30) parts by volume of the mixture were so extracted with 64 parts by volume of liquid carbon dioxide. The system separated into a lower layer, 22 parts, and an upper layer, 72 parts. The layers were drawn off and collected separately. Following evaporation of carbon dioxide from the layers, the lower layer comprised 14 parts and the upper layer 16 parts. When analyzed by refractive index determination, the lower or raffinate layer contained 75 volume per cent of alpha-methylnaphthalene, and the upper or extract layer contained 59 volume per cent of alpha-methylnaphthalene, a spread of 16 per cent.

Two extractions of the same mixture with double its volume of triethylene glycol at 20–25° C. and one atmosphere, provided extracts containing 73 per cent and 76 per cent of alpha-methylnaphthalene, and raffinates containing 54 per cent and 57 per cent, respectively, of alpha-methylnaphthalene, a spread of 19 per cent in each case. The extracts comprised the lower layers in these extractions because of the greater density of the triethylene glycol.

Twenty parts by volume of the aforesaid di - (secondary - butyl) benzene - alpha - methylnaphthalene mixture were extracted simultaneously with twenty-five parts of triethylene glycol and fifty-five parts of liquid carbon dioxide at 19° C. and 890 p. s. i. in the aforesaid Jerguson gauge, whereupon three layers formed. The upper layer comprised 45 parts, the middle layer 3 parts and the lower layer 52 parts. Each layer was withdrawn separately. When carbon dioxide was evaporated from the bottom layer (glycol extract), two layers formed, so that four fractions in all were obtained. Each fraction was washed with water to remove triethylene glycol, dried over calcium chloride, and analyzed by refractive index. The lower layer of the glycol extract contained 89 volume per cent of alpha-methylnaphthalene, as opposed to the carbon dioxide extract which contained only 47 volume per cent.

The results of the extractions of the di-(secondary - butyl) benzene - alpha - methylnaphthalene mixture are summarized in Table II following.

Table II

[Extractions of One Volume of a Mixture of 66.7% Alpha-Methylnaphthalene and 33.3% di-(secondary-butyl) benzene.]

| No. | Solvent | Vol. Solvent per vol. Hydrocarbons | Extraction Temp. (° C.) | Vol. Percent of Original Mixture in Extract | Volume Percent of Alpha-Methylnaphthalene | | | | |
| --- | --- | --- | --- | --- | --- | --- | --- | --- | --- |
| | | | | | Feed | Carbon Dioxide Extract | Raffinate | Glycol Extract | Difference |
| 1 | Liquid carbon dioxide | 2.1 | 10 | 53 | 66.7 | 59 | 75 | | 16 |
| 2 | Triethylene Glycol | 2.0 | 20–25 | 60 | 66.7 | | 54 | 73 | 19 |
| 3 | ----do---- | 3.0 | 20–25 | 50 | 66.7 | | 57 | 76 | 19 |
| 4 | {Liquid carbon dioxide | 2.7 | 19 | 35 (in CO₂) | 66.7 | 47 | 63 | 89 (2d fraction). | 42 |
| | {Triethylene Glycol | 1.2 | | 28 (in glycol) | | | | 67 | |

The spread between the compositions of the carbon dioxide extract and the triethylene glycol extract realized in the example 4, above, is more than the sum of those obtained in the extractions of the same hydrocarbon mixture by the two solvents separately. Moreover, the system is well adapted for continuous countercurrent operation since each solvent can be passed in opposite directions at such rates as to withdraw only mixtures of maximum and minimum content of alpha-methylnaphthalene. The quaternary or four component system, liquid carbon dioxide - triethylene glycol - alpha - methylnaphthalene-di-(secondary butyl) benzene, is shown diagrammatically in Figure 9. The three corner triangles shown should be bent upward together to form a regular tetrahedron in order to provide a more complete diagrammatic presentation. However, Figure 9 does not show the existence of three layers or phases. These are only stable in certain quaternary mixtures within the volume of the solid tetrahedron and would appear only in a solid partly transparent diagram showing its internal structure.

I claim:

1. The process of separating a hydrocarbon mixture selected from the group consisting of hydrocarbon mixtures within the range of gas oils to lubricating oil stocks; into fractions at least one of which has a higher viscosity index than the original mixture, which comprises: contacting the mixture with liquid carbon dioxide and a solvent under sufficient pressure to maintain a carbon dioxide-rich phase in the liquid state, whereupon a carbon dioxide extract phase, a solvent extract phase, and an oil phase are formed, said solvent being selected from the group consisting of: aldol, aniline, β-chloroethanol, α-chloropropionic acid, cinnamyl alcohol, diethylene glycol, dipropylene glycol, ethylene glycol, 2,4-dinitrochlorobenzene, formamide, formanilide, furfuryl alcohol, glycerol, β-hydroxyethylacetate, β-hydroxypropionitrile, lactic acid, maleic anhydride, monoacetin, o-nitroanisole, phenylethanolamine, piperonal, succinonitrile, propylene glycol and triethylene glycol; effecting phase separation under pressure of the carbon dioxide extract, solvent extract and oil phase; removing carbon dioxide and solvent from the carbon dioxide extract, thereby obtaining a hydrocarbon fraction of higher viscosity index than the original hydrocarbon mixture.

2. The process as defined by claim 1 wherein the solvent is β-chloroethanol.

3. The process as defined by claim 1 wherein the solvent is furfuryl alcohol.

4. The process of separating a lubricating oil into fractions at least one of which has a higher viscosity index than the original lubricating oil, which comprises: contacting the oil with liquid carbon dioxide and a solvent under sufficient pressure to maintain a carbon dioxide-rich phase in the liquid state, whereupon a carbon dioxide extract phase, a solvent extract phase, and an oil phase are formed, said solvent being selected from the group consisting of: aldol, aniline, $\beta$-chloroethanol, $\alpha$-chloropropionic acid, cinnamyl alcohol, diethylene glycol, dipropylene glycol, ethylene glycol, 2,4-dinitrochlorobenzene, formamide, formanilide, furfuryl alcohol, glycerol, $\beta$ - hydroxyethylacetate, $\beta$ - hydroxypropionitrile, lactic acid, maleic anhydride, monoacetin, o-nitroanisole, phenylethanolamine, piperonal, succinonitrile, propylene glycol and triethylene glycol; effecting phase separation under pressure of the carbon dioxide extract, solvent extract, and oil phase; removing carbon dioxide and solvent from the carbon dioxide extract, thereby obtaining an oil fraction of higher viscosity index than the original lubricating oil.

5. The continuous process of separating a lubricating oil into fractions at least one of which has a higher viscosity index than the original oil and at least one of which has a lower viscosity index than the original oil, which comprises: contacting the oil with liquid carbon dioxide and a solvent under sufficient pressure to maintain a carbon dioxide-rich phase in the liquid state, whereupon a carbon dioxide extract phase, a solvent extract phase, and an oil phase are formed, said solvent being selected from the group consisting of: aldol, aniline, $\beta$-chloroethanol, $\alpha$-chloropropionic acid, cinnamyl alcohol, diethylene glycol, dipropylene glycol, ethylene glycol, 2,4 - dinitrochlorobenzene, formamide, formanilide, furfuryl alcohol, glycerol, $\beta$-hydroxyethylacetate, $\beta$-hydroxypropionitrile, lactic acid, maleic anhydride, monoacetin, o-nitroanisole, phenylethanolamine, piperonal, succinonitrile, propylene glycol and triethylene glycol; effecting phase separation under pressure of the carbon dioxide extract, solvent extract and oil phase; removing carbon dioxide and solvent from the carbon dioxide extract, thereby obtaining an oil fraction of higher viscosity index than the original lubricating oil, and removing from the system said oil fraction of higher viscosity index; removing solvent and carbon dioxide from the solvent extract, thereby obtaining an oil fraction of lower viscosity index than the original lubricating oil, and removing from the system said oil fraction of lower viscosity index; and recycling to said contacting operation said oil phase.

6. The process as defined by claim 5 wherein the solvent is $\beta$-chloroethanol.

7. The process as defined by claim 5 wherein the solvent is furfuryl alcohol.

8. The process of separating a mixture of hydrocarbons into fractions of different properties, which mixture is selected from the group consisting of hydrocarbon mixtures within the range of gas oils to lubricating oil stocks, which comprises: contacting the mixture with liquid carbon dioxide and a solvent under sufficient pressure to maintain a carbon dioxide-rich phase in the liquid state, whereupon a carbon dioxide extract phase, a solvent extract phase, and a phase consisting essentially of said mixture of hydrocarbons are formed, said solvent being selected from the group consisting of: aldol, anilene, $\beta$-chloroethanol, $\alpha$-chloropropionic acid, cinnamyl alcohol, diethylene glycol, dipropylene glycol, ethylene glycol, 2,4-dinitrochlorobenzene, formamide, formanilide, furfuryl alcohol, glycerol, $\beta$ - hydroxyethylacetate, $\beta$ - hydroxypropionitrile, lactic acid, maleic anhydride, monoacetin, o-nitroanisole, phenylethanolamine, piperonal, succinonitrile, propylene glycol and triethylene glycol; effecting phase separation under pressure of the carbon dioxide extract, solvent extract and the phase consisting essentially of said mixture of hydrocarbons; removing carbon dioxide and solvent from the carbon dioxide extract phase and from the solvent extract phase, thereby obtaining fractions differing in properties and having different properties from those of the original mixture of hydrocarbons.

9. The process of separating a polycyclic hydrocarbon and a monocyclic hydrocarbon of similar boiling point from a mixture containing the same, which comprises: contacting the mixture with liquid carbon dioxide and a solvent under sufficient pressure to maintain a carbon dioxide-rich phase in the liquid state, whereupon a carbon dioxide extract phase, a solvent extract phase, and a phase consisting essentially of said original mixture are formed, said solvent being selected from the group consisting of: aldol, aniline, $\beta$-chloroethanol, $\alpha$-chloropropionic acid, cinnamyl alcohol, diethylene glycol, dipropylene glycol, ethylene glycol, 2,4-dinitrochlorobenzene, formamide, formanilide, furfuryl alcohol, glycerol, $\beta$ - hydroxyethylacetate, $\beta$ - hydroxypropionitrile, lactic acid, maleic anhydride, monoacetin, o-nitroanisole, phenylethanolamine, piperonal, succinonitrile, propylene glycol and triethylene glycol; effecting phase separation under pressure of the carbon dioxide extract, solvent extract, and the phase consisting essentially of said original mixture; removing carbon dioxide and solvent from said carbon dioxide extract phase, thereby obtaining a fraction substantially richer in said monocyclic hydrocarbon than said original mixture; and removing carbon dioxide and solvent from said solvent extract phase, thereby obtaining a fraction substantially richer in said polycyclic hydrocarbon than said original mixture.

10. The process of separating alpha-methylnaphthalene and di-(secondary-butyl) benzene from a mixture containing the same, which comprises: contacting the mixture with liquid carbon dioxide and triethylene glycol under sufficient pressure to maintain a carbon dioxide-rich phase in the liquid state, whereupon a carbon dioxide extract phase, a triethylene glycol extract phase, and a phase consisting essentially of said original mixture are formed; effecting phase separation under pressure of the carbon dioxide extract, glycol extract, and the phase consisting essentially of said original mixture; removing carbon dioxide and glycol from said carbon dioxide extract phase, thereby obtaining a fraction substantially richer in said di-(secondary-butyl) benzene than said original mixture; and removing carbon dioxide and glycol from said glycol extract phase, thereby obtaining a fraction substantially richer in said alpha-methylnaphthalene than said original mixture.

ALFRED W. FRANCIS.

REFERENCES CITED

The following references are of record in the file of this patent:

UNITED STATES PATENTS

| Number | Name | Date |
|---|---|---|
| 1,805,751 | Auerbach | May 19, 1931 |
| 1,879,686 | Jager et al. | Sept. 27, 1932 |
| 2,188,051 | Lantz | Jan. 23, 1940 |
| 2,229,995 | Yabroff et al. | Jan. 28, 1941 |